April 2, 1929. C. S. SNAVELY ET AL Re. 17,252

ELECTRICAL RELAY

Original Filed May 12, 1924

INVENTORS:
C. S. Snavely, and
W. B. Wells,
by A. L. Vencill
Their attorney

Reissued Apr. 2, 1929. Re. 17,252

UNITED STATES PATENT OFFICE.

CLARENCE S. SNAVELY, OF PITTSBURGH, AND WESLEY B. WELLS, OF WILKINSBURG, PENNSYLVANIA, ASSIGNORS TO THE UNION SWITCH & SIGNAL COMPANY, OF SWISSVALE, PENNSYLVANIA, A CORPORATION OF PENNSYLVANIA.

ELECTRICAL RELAY.

Original No. 1,676,466, dated July 10, 1928, Serial No. 712,556, filed May 12, 1924. Application for reissue filed January 29, 1929. Serial No. 335,799½.

Our invention relates to electrical relays, and particularly to relays for intermittently closing an electrical circuit.

We will describe one form of relay embodying our invention, and will then point out the novel features thereof in claims.

Figure 1:
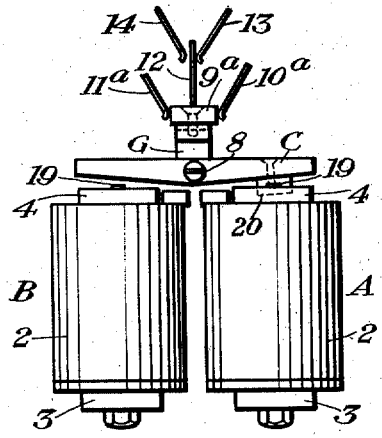
Figure 2:
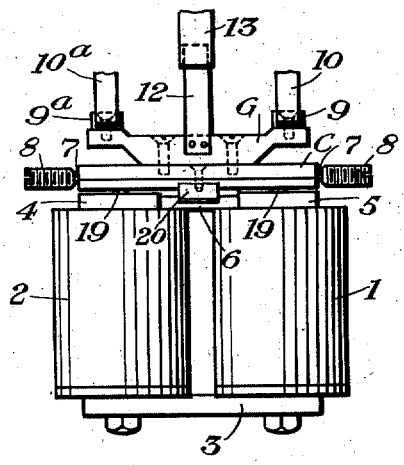
Figure 3:
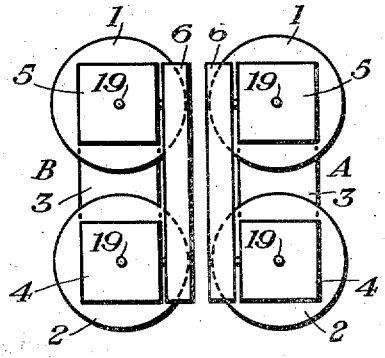
Figure 4:
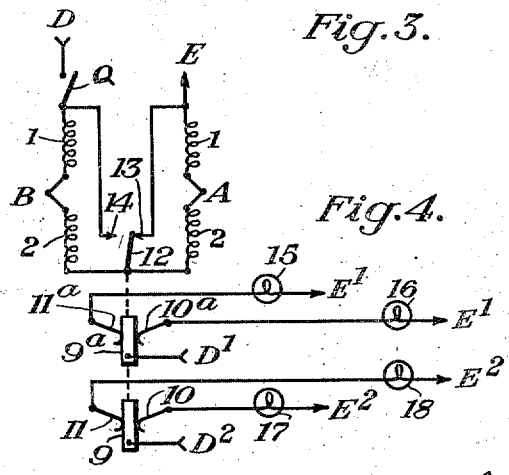

In the accompanying drawing, Fig. 1 is a view showing, in front elevation, one form of relay embodying our invention. Fig. 2 is a view showing, in side elevation, the relay of Fig. 1. Fig. 3 is a top plan view of the magnets A and B of the relay illustrated in Figs. 1 and 2. Fig. 4 is a diagrammatic view showing one circuit arrangement which may be used with the relay shown in Figs. 1, 2 and 3 and also embodying our invention.

Similar reference characters refer to similar parts in each of the several views.

Referring first to Figs. 1, 2 and 3, the relay comprises an armature C operated by two electromagnets A and B. Each of the magnets A and B comprises, as usual, two windings 1 and 2, a back strap 3, and two pole pieces 4 and 5. The armature C is a rectangular plate of magnetizable material provided, at the middle, with holes to receive two pivot pins 7 carried by threaded supporting screws 8. These screws 8 are supported by suitable means not shown in the drawing. The parts are so proportioned and disposed that the pivotal axis of the armature is between and above the magnets A and B, as best shown in Fig. 1. It will therefore be clear that when magnet A is energized armature C is swung in clockwise direction as viewed in Fig. 1, and when magnet B is energized, armature C is swung in counter-clockwise direction as shown in the same view.

Attached to the upper side of armature C is a supporting member G of insulating material carrying two contact blocks 9 and $9^a$, and a contact arm 12. As shown in Fig. 1, contact arm 12 co-acts with two fixed contact fingers 13 and 14 so that when the arm is swung to the right, contact 12—13 is closed, when arm 12 is swung to the left, contan 12—14 is closed, and when the arm 12 is in an intermediate position, contacts 12—13 and 12—14 are both open. Block $9^a$ co-operates with two flexible fixed contact fingers so that when the armature is in an intermediate position contacts $9^a$—$10^a$ and $9^a$—$11^a$ are both closed. When the block $9^a$ is swung to the left, contact $9^a$—$10^a$ opens and when block $9^a$ is swung to the right, contact $9^a$—$11^a$ opens. Block 9 co-acts with two contact members 10 and 11 in a similar manner. (See Fig. 4.)

A small weight 20 of non-magnetic material is attached to the right hand side of armature C to bias the armature to a position in which contact 12—13 is closed, but this biasing action is not sufficient to open contacts $9^a$—$11^a$ and 9—11.

Referring to Fig. 4 the windings 1 and 2 of both magnets A and B are connected in series and supplied with current from terminals D and E of a suitable source of energy not shown in the drawing. It will be seen from the wiring diagram, however, that when contact 12—14 is closed, windings 1 and 2 of magnet B are short circuited; and that when contact 12—13 is closed, windings 1 and 2 of magnet A are short circuited. The supply of current to the relay may be controlled in any suitable manner such as by a switch Q.

When switch Q is open the parts occupy the positions shown in the drawing, in which armature C is swung slightly away from an intermediate position to close contact 12—13. If now, switch Q is closed, current flows through the windings of magnet B, but contact 12—13 being closed, the windings of magnet A are short circuited and this latter magnet does not become energized. The energization of magnet B causes armature C to swing about its pivots so its left hand leaf engages the core pins 19 of magnet B. During this motion, however, contact 12—13 opens and contact 12—14 closes. The closing of contact 12—14 short circuits the windings of magnet B and the field of this magnet commences to decay. Due, however, to the short circuited winding this decay is comparatively slow. The decay of the field is further retarded by the low reluctance of the magnetic circuit, armature C now being adjacent the poles 4 and 5 of magnet B and thus decreasing the air gaps. The opening of contact 12—13 meantime has allowed magnet A to become energized. The growth of the field of magnet A is comparatively rapid, and after an interval of time the torque exerted by the decreasing flux of magnet B will be over-balanced by the torque exerted by the flux from magnet A and the armature will swing in a clockwise direction till arrested by core pins 19 in pole pieces 4 and 5 of magnet A. This motion will first open contact 12—14 and then close contact 12—13. The field of magnet B will then rapidly build up and the field of magnet A will slowly decay, this decay being retarded by the self-induction of the magnet windings. Eventually the torque exerted by magnet A will not be sufficient to hold the armature and the armature will swing in a counter-clockwise direction till it engages core pins 19 in magnet B. It will therefore be clear that the armature is positively swung to and fro as long as switch Q is closed, and it will also be clear that a considerable interval of time elapses between armature movement but that the actual armature movements are performed quickly, thus insuring good contact operation without arcing or sparking. If switch Q is opened, the parts return to the positions shown in the drawing under the influence of gravity acting on weight 20.

In order to increase the time interval between successive armature movements, we preferably provide each magnet with a magnetic path of low reluctance between the pole pieces of the magnet. As here shown this path comprises a shunting bar 6 of magnetizable material placed across the pole pieces 4 and 5 of each magnet but spaced from such pole pieces by a small air gap. The operation of these shunts is as follows:

Assuming that the left hand side of armature C is against the core pins 19 in the pole pieces of magnet B, then as the field of magnet B decays, this decay will be retarded, as explained above, by the self-induction of the windings 1 and 2. The retardation of this decay will, however, be increased by the flux through the windings of magnet B and shunt 6. At the same time the increasing field in magnet A is partially shunted by bar 6 associated therewith and therefore the effective torque exerted by magnet A is decreased due to the presence of the shunt 6. As a result a larger interval elapses before the torque of the one magnet is equal to that of the other and hence the time period of the relay is increased.

The time element between successive armature movements of the relay may be adjusted to any value within reasonable limits by the adjustment and proportion of the various parts.

One advantage of our invention is that it permits a flashing relay to be constructed so that the time interval is substantially independent of fluctuation in the electromotive force of the energy supply. This feature results from the fact that the moving armature is acted upon by two opposed forces each dependent upon the supply voltage. Thus the torque exerted by the energized magnet must be greater than the opposing torque exerted by the short circuited magnet before the relay will reverse. Each of these torques increases with an increase in supply voltage and the tendency is therefore for the period of the relay to remain constant.

The relay may be used to control auxiliary apparatus in any suitable manner. As here shown this apparatus comprises lamps 15, 16, 17 and 18. It will be plain from Fig. 4, that when contacts 9—10 and $9^a$—$10^a$ are closed, that is, when armature C is swung in a clockwise direction or is in the intermediate position, lamps 16 and 17 are lighted but that when the armature is swung in the opposite direction to close contacts 9—11 and $9^a$—$11^a$ or is in the intermediate position, lamps 15 and 18 are lighted.

Although we have herein shown and described only one form of relay embodying our invention, it is understood that various changes and modifications may be made therein within the scope of the appended claims without departing from the spirit and scope of our invention.

Having thus described our invention, what we claim is:

1. An electromagnetic device comprising a pivoted armature, two electromagnets one on each side of the pivotal axis of said armature whereby the armature is swung in one direction or the other according as one magnet or the other is energized, means effective when the armature is swung toward either magnet for placing the winding of such magnet on short circuit, and an auxiliary magnetic path of low reluctance connecting the two poles of each maget for delaying the decay of flux in the core of the magnet when the magnet becomes de-energized and for delaying the action of the magnet on the armature when the magnet becomes energized.

2. An electromagnetic device comprising a pivoted armature, two electromagnets one on each side of the pivotal axis of said armature whereby the armature is swung in one direction or the other according as one magnet or the other is energized, means effective when the armature is swung toward either magnet for placing the winding of such magnet on short circuit, and a magnetizable shunting bar for each magnet connecting the two pole pieces of the magnet but spaced from each pole piece by a small air gap, each such bar constituting an auxiliary magnetic path for its associated magnet for delaying the decay of flux in the core of the magnet when the magnet becomes de-energized and for delaying the action of the magnet on the armature when the magnet becomes energized.

In testimony whereof we affix our signatures.

CLARENCE S. SNAVELY.
WESLEY B. WELLS.